(12) United States Patent
Deyaf et al.

(10) Patent No.: US 9,466,988 B2
(45) Date of Patent: Oct. 11, 2016

(54) INDUCTION POWER TRANSFER FOR AUXILIARY VEHICLE LIGHTS

(71) Applicant: Feniex Industries Inc.

(72) Inventors: Hamza Deyaf, Austin, TX (US); Alaa Hassan, Austin, TX (US)

(73) Assignee: Feniex Industries Inc., Austin, TX (US)

( * ) Notice: Subject to any disclaimer, the term of this patent is extended or adjusted under 35 U.S.C. 154(b) by 416 days.

(21) Appl. No.: 14/201,834

(22) Filed: Mar. 8, 2014

(65) Prior Publication Data

US 2015/0251584 A1    Sep. 10, 2015

(51) Int. Cl.
*H02J 5/00* (2016.01)
*H04B 5/00* (2006.01)
*B60Q 1/00* (2006.01)
*B60Q 1/26* (2006.01)
*B60R 16/03* (2006.01)

(52) U.S. Cl.
CPC ............. *H02J 5/005* (2013.01); *B60Q 1/0088* (2013.01); *B60Q 1/2611* (2013.01); *H04B 5/0037* (2013.01); *H04B 5/0081* (2013.01); *B60Q 2900/30* (2013.01); *B60R 16/03* (2013.01)

(58) Field of Classification Search
CPC .................................................. H05B 37/0272
USPC ..................................... 307/10.8, 9.1; 315/77
See application file for complete search history.

(56) References Cited

U.S. PATENT DOCUMENTS

2006/0012307 A1* 1/2006 Bucher .................. B60Q 1/302
                                                          315/77
2012/0032632 A1* 2/2012 Soar ........................ H01F 38/14
                                                          320/108

* cited by examiner

*Primary Examiner* — Joseph Chang (57) ABSTRACT

An induction power transfer system for auxiliary vehicle lights is provided. A transmitting power module coupled to an interior surface of a windshield includes a transmitting induction coil. The transmitting induction coil generates an oscillating magnetic field in response to receiving an electric current. A receiving power module is coupled to an exterior surface of the windshield of the vehicle. The receiving power module is substantially aligned with the transmitting power module coupled to the interior surface of the windshield. The receiving power module includes a receiving induction coil. The receiving induction coil generates an alternating electric current in response to a presence of the oscillating magnetic field. An auxiliary vehicle LED light coupled to an exterior surface of the vehicle is connected to the receiving power module by an insulated conductor. The receiving power module supplies the alternating electric current to the auxiliary vehicle LED light.

20 Claims, 6 Drawing Sheets

INDUCTION POWER TRANSFER FOR AUXILIARY VEHICLE LIGHTS

BACKGROUND OF THE INVENTION (1) Field of the Invention

The illustrative embodiments relate generally to induction power transfer, and more particularly, to a method, system, and apparatus for an induction power transfer system for vehicle LED auxiliary lights.

(2) Background Art

An exterior auxiliary vehicle light emitting diode (hereinafter "LED") light is a supplemental LED light or emergency LED warning light that a user may add to an exterior of a vehicle. Examples of auxiliary vehicle LED lights include, for example and without limitation, an emergency light bar, a beacon light, sport utility vehicle (SUV) off-road lights, vehicle roof mounted fog lights, license plate warning lights, pick-up bed lights, and other add-on emergency and supplemental vehicle lights that may be installed on a vehicle by a user.

Typically, a user must disassemble multiple parts of a vehicle in order to attach an auxiliary vehicle LED light to the vehicle and wire the auxiliary vehicle LED light to the vehicle battery or other power source on the vehicle, such as a cigarette lighter. Upon completion of the installation and wiring process, the user must correctly reassemble each of the disassembled parts of the vehicle.

For example, to install a roof mounted auxiliary vehicle LED light, such as a police car emergency LED light bar, a user typically removes the head liner of the vehicle, drills a hole through the metal roof of the vehicle to run the auxiliary LED light wires into the vehicle, removes side panels and seats within the passenger compartment to run the wiring through the passenger compartment to the vehicle battery to complete wiring of the auxiliary LED light. Then, the user re-installs the seats, side panels, head liner, and other vehicle parts that were removed during the installation process. This is a time-consuming and labor-intensive process.

Moreover, the process of installing auxiliary vehicle LED lights frequently results in undesirable, permanent modifications to the vehicle. For example, when installing an auxiliary LED light, a user may be required to drill one or more holes in the metal roof, body, and/or frame of the vehicle to accommodate power cords and wiring for the auxiliary LED light device.

Thus, the process for installing auxiliary vehicle LED lights to a vehicle is a labor intensive, time-consuming, and arduous process that may result in permanent undesirable modifications to the vehicle.

BRIEF SUMMARY OF THE INVENTION

An illustrative embodiment provides an induction power transfer system for auxiliary vehicle lights. A transmitting power module is coupled to an interior surface of a windshield of a vehicle. A power source is connected to the transmitting power module. The power source supplies an electric current to the transmitting power module. The transmitting power module includes a transmitting induction coil. The transmitting induction coil generates an oscillating magnetic field in response to the electric current passing through the transmitting induction coil.

A receiving power module is coupled to an exterior surface of the windshield of the vehicle. The receiving power module is substantially aligned with the transmitting power module coupled to the interior surface of the windshield. The receiving power module includes a receiving induction coil. The receiving induction coil generates an electric current in response to a presence of the oscillating magnetic field. An auxiliary LED light is coupled to an exterior surface of the vehicle. The auxiliary LED light is connected to the receiving power module by an insulated conductor. The receiving power module supplies the electric current to the auxiliary LED light. The electric current supplied by the receiving power module powers the auxiliary LED light coupled to the exterior surface of the vehicle.

Another embodiment provides an inductive power transfer system for an emergency vehicle. A windshield of an emergency vehicle has an interior surface and an exterior surface. A transmitting power module is coupled to the interior surface of the windshield. A receiving power module is coupled to the exterior surface of the windshield of the emergency vehicle. The receiving power module on the exterior surface of the windshield is substantially aligned with the transmitting power module on the interior surface of the windshield. The transmitting power module includes a power induction board and a transmitting induction coil. A user controller includes a wireless communication transmitter. The wireless communication transmitter transmits a wireless data signal to the receiving power module when the user controller receives a user input.

A power source is connected to the transmitting power module by way of a first insulated conductor. A second insulated conductor connects the power source to the user controller. The power source supplies direct current power to the transmitting power module and the user controller. The power induction board converts the direct current power to an alternating electric current. An oscillating magnetic field is generated by the transmitting induction coil in response to receiving the first alternating electric current from the power source. The receiving power module includes a receiving induction coil, a rectification circuit associated with the receiving induction coil, a power conditioning board, and a wireless communication receiver adapted to receive the wireless data signal from the transmitting power module.

The receiving power module transmits a data signal to a LED warning light. The LED warning light is mounted to an exterior surface of the emergency vehicle. The LED warning light includes a set of LED lights, an LED power converter, and the third insulated conductor connecting the LED warning light to the receiving power module. The third insulated conductor supplies a direct electric current to the LED warning light. The direct electric current powers the LED warning light. A fourth insulated conductor connects the wireless communication receiver to the LED controller. The fourth insulated conductor transmits the data signal from the wireless communication receiver to an LED controller associated with the LED warning light. The LED controller performs a control function on the set of LED lights in response to receiving the data signal.

Yet another illustrative embodiment provides a method for induction power transfer to an auxiliary LED light mounted on an exterior surface of a vehicle. In this embodiment, a transmitting power module is coupled to the interior surface of a windshield of a vehicle. The transmitting power module is substantially aligned with a receiving power module coupled to an exterior surface of the windshield of the vehicle.

In response to receiving an electric current, a transmitting induction coil associated with the transmitting power module generates an oscillating magnetic field. In response to a presence of the oscillating magnetic field within a range of a receiving induction coil associated with a receiving power module, the receiving induction coil generates an alternating electric current by the receiving induction coil. The second alternating electric current is transmitted to the auxiliary LED light mounted on the exterior surface of the vehicle via a set of insulated conductors. The auxiliary LED light comprises a set of LED lights. The second alternating electric current powers the auxiliary LED light on the exterior surface of the vehicle.

In response to receiving a user input by a user controller, a data signal is transmitted to the receiving power module mounted on the exterior surface of the vehicle. The data signal is transmitted from the receiving power module to the auxiliary LED light via the set of insulated conductors. The user controller performs a control function on the set of LED lights in response to receiving the data signal.

BRIEF DESCRIPTION OF THE SEVERAL VIEWS OF THE DRAWINGS

The novel features believed characteristic of the invention are set forth in the appended claims. The illustrative embodiments, as well as a preferred mode of use, further objectives and advantages thereof, will best be understood by reference to the following detailed description when read in conjunction with the accompanying drawings, wherein:

DETAILED DESCRIPTION OF THE INVENTION

Frequently, it is desirable or necessary to attach one or more auxiliary light devices to a vehicle. For example, when an automobile is converted into a police car, it may be necessary to install an emergency light bar or beacon lights on a roof of the police car, flashers on a front grill of the police car, flashers on a back of the police car, or various other emergency light devices.

The different illustrative embodiments recognize and take into account that installing auxiliary light devices on a vehicle typically requires drilling one or more permanent holes into the vehicle body, disassembling multiple parts of the vehicle, installing the auxiliary light device, wiring the auxiliary light device to a vehicle power source, and then reassembling the parts of the vehicle that were disassembled during the installation process.

The different illustrative embodiments recognize that magnetic induction may be used to provide wireless power to an electronic device. Magnetic induction may be used to wirelessly transmit electrical energy between two coils of conductive material. When an alternating electric current runs through a first coil of conductive material, it generates a magnetic field. If a second coil of conductive material comes into contact with the magnetic field, it will generate an alternating electric current in the second coil.

The embodiments recognize that magnetic induction is an impractical method for wirelessly transferring power to an auxiliary light device attached to the outside of a vehicle because magnetic induction does not work through metal and other conductive materials. Thus, the embodiments recognize that magnetic induction is not an effective method for wirelessly transferring electrical power through the metal roof or metal body of a vehicle because the metal interferes with the magnetic induction.

The different illustrative embodiments also recognize that a need exists to wirelessly provide power to an auxiliary light device without drilling holes through the roof or metal body of the vehicle. The embodiments recognize a need to power an auxiliary light device on an exterior of a vehicle without disassembling one or more parts of the vehicle to accommodate electrical wiring to power the auxiliary light device. In other words, the embodiments recognize a need for a system, apparatus, and method for wirelessly transferring electrical power from a vehicle power source to an auxiliary light device attached to an exterior of the vehicle to wirelessly power the auxiliary light device.

Figure 1:
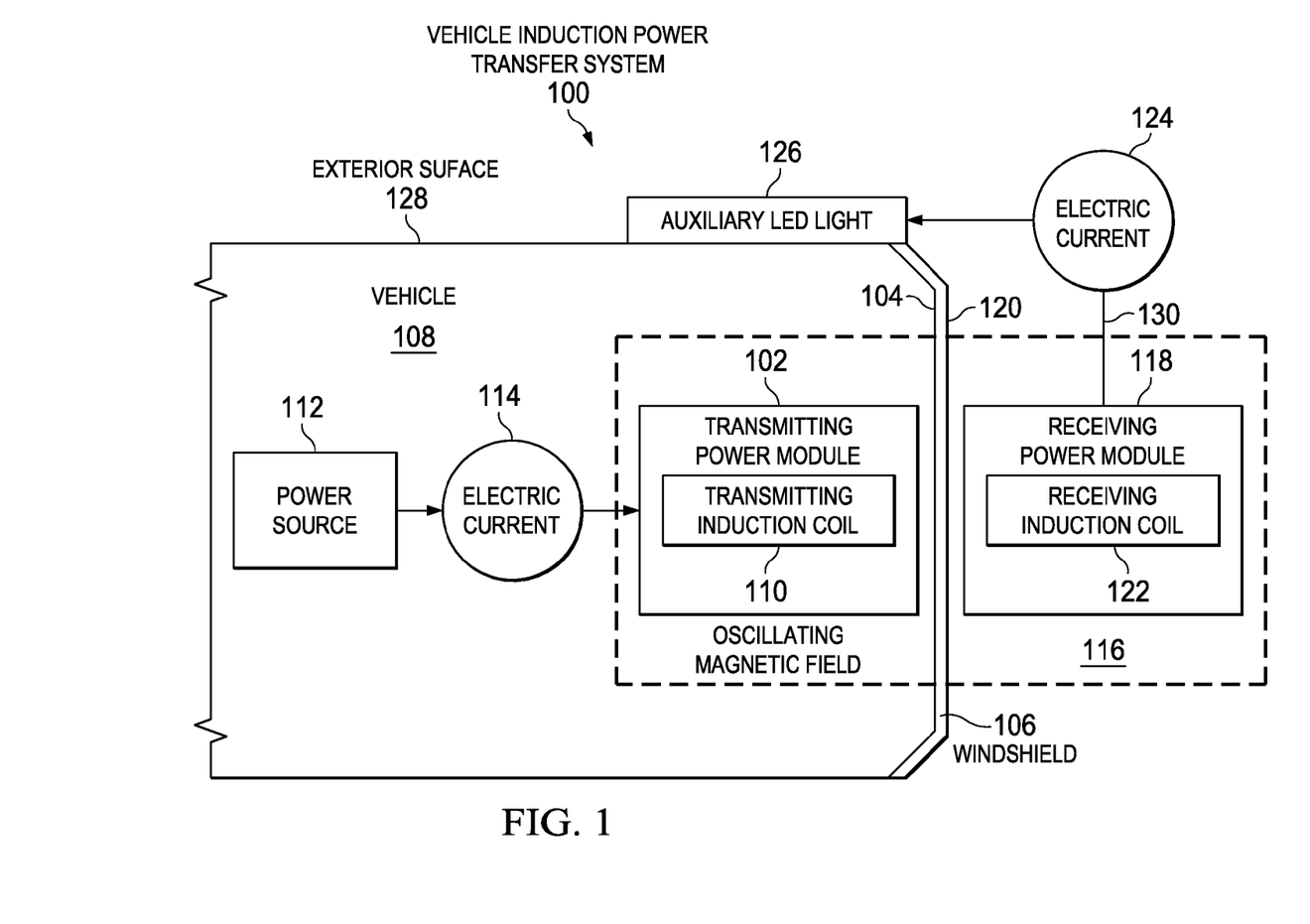
FIG. 1 is an illustration of a vehicle induction power transfer system through windshield to power an auxiliary LED light in accordance with an illustrative embodiment.

Referring now to FIG. 1, an illustration of a vehicle induction power transfer system through windshield to power an auxiliary LED light is depicted in accordance with an illustrative embodiment. The vehicle induction power transfer system 100 is a system for wirelessly transmitting power to an auxiliary vehicle light device using magnetic induction.

The vehicle induction power transfer system 100 includes a transmitting power module 102 coupled to an interior surface 104 of a windshield 106 of a vehicle 108.

The transmitting power module 102 includes a transmitting induction coil 110. The transmitting induction coil 110 is a loop or coil of conducting material for magnetic induction, such as, for example but without limitation, copper.

A power source 112 is connected to the transmitting power module 102. The power source 112 may be any source of power associated with the vehicle 108, such as, but without limitation, a vehicle battery, a cigarette lighter, or a solar panel for generating electric current. In this non-limiting embodiment, the power source 112 is a single vehicle battery. However, in another embodiment, the power source 112 may include two or more batteries.

The power source 112 supplies an electric current 114 to the transmitting power module 102. In this illustrative example, the electric current 114 is a direct current of electricity. However, in another embodiment, the electric current 114 may be an alternating electric current.

The transmitting induction coil 110 generates an oscillating magnetic field 116 when the electric current 114 passes through the transmitting induction coil 110. The oscillating magnetic field 116 may also be referred to as an alternating electromagnetic field. The transmitting induction coil 110 generates the oscillating magnetic field 116 within a vicinity of the transmitting induction coil 110. In other words, the oscillating magnetic field 116 is present within a given range of the transmitting induction coil 110. However, the oscillating magnetic field 116 is not present outside the given range of the transmitting induction coil 110.

A receiving power module 118 is coupled to an exterior surface 120 of the windshield 106 of the vehicle 108. The receiving power module 118 includes a receiving induction coil 122. The receiving induction coil 122 is a loop or coil made of a conducting material.

The receiving induction coil 122 generates an electric current 124 when the oscillating magnetic field 116 is within range of the receiving induction coil 122. The oscillating magnetic field 116 induces the electric current 124 in or on the receiving induction coil 122. However, if the receiving induction coil 122 is out of range or out of the vicinity of the oscillating magnetic field 116, the receiving power module 118 does not generate the electric current 124.

In this embodiment, the electric current 124 generated by the receiving induction coil 122 is an alternating current of electricity. The receiving power module 118 then converts this alternating current of electricity into direct current electricity for utilization by an auxiliary LED light 126.

An insulated conductor wire 130 connects the receiving power module 118 to an auxiliary LED light 126. The receiving power module 118 supplies the electric current 124 to the auxiliary LED light 126 via the insulated conductor wire 130. The insulated conductor wire 130 is any type of conductor for transmitting the electric current 124, such as, for example but without limitation, an electrical cord or insulated electrical wire.

The auxiliary LED light 126 is an auxiliary vehicle light coupled to an exterior surface 128 of the vehicle 108. The auxiliary LED light 126 may be, for example, but without limitation, a LED warning light, a roof mounted fog light, a pick up bed light strip, a license plate light, a roof mounted taxi light, a roof mounted electronic advertising light up sign, a light up bus destination sign, a roof mounted off road sport utility vehicle light, or any other type of auxiliary vehicle light.

A LED warning light is an auxiliary vehicle LED light utilized on an emergency vehicle. A LED warning light may be for example, but without limitation, a LED light bar, a mini LED light bar, a license plate warning light, a grill light, a hideaway light, a LED beacon, or a vehicle flasher.

An emergency vehicle is a law enforcement vehicle, a fire department vehicle, an emergency medical vehicle, a public utility vehicle, a tow truck, or construction vehicle. A law enforcement vehicle is a vehicle utilized by a law enforcement agency or organization. A law enforcement vehicle may be, without limitation, a police car, a SWAT van, a search and rescue vehicle, or any other emergency vehicle. A law enforcement agency or organization may be, without limitation, a police department, a sheriff's department vehicle, U.S. Marshal Service vehicle, or any other law enforcement vehicle.

An emergency medical vehicle is a vehicle for transporting a sick or injured person. An emergency medical vehicle may be, for example, an ambulance. A fire department vehicle may be, for example, a fire truck. A public utility vehicle is a vehicle used by a utility, such as the water department, an electric power utility provider, a gas utility provider, and other public works vehicles. A tow truck is a vehicle for towing one or more other vehicles. A tow truck may also be referred to as a wrecker.

Figure 2:
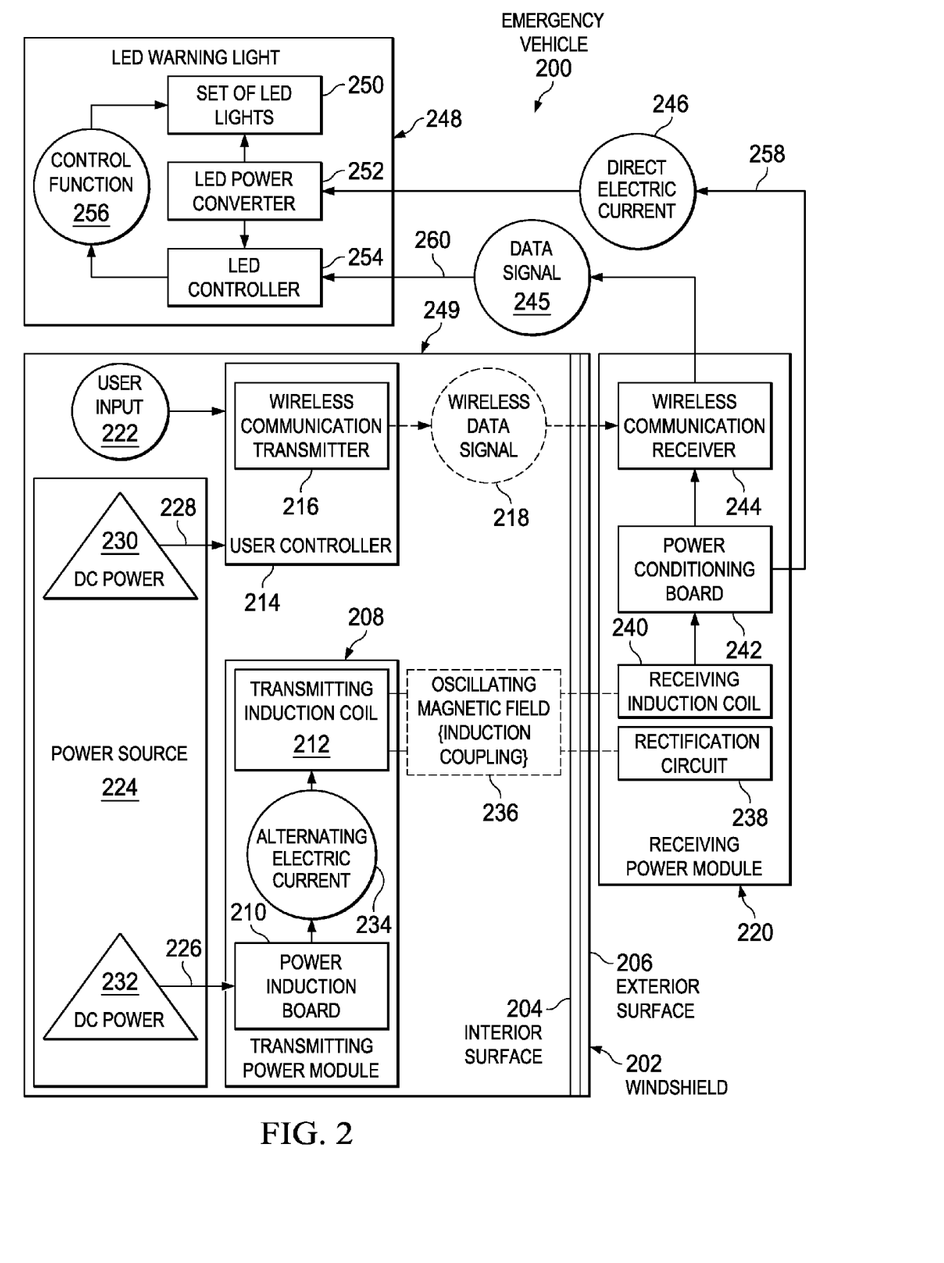
FIG. 2 is a block diagram of an induction power transfer system for a vehicle LED warning light in accordance with an illustrative embodiment.

FIG. 2 is a block diagram of an induction power transfer system for a vehicle LED warning light in accordance with an illustrative embodiment. An emergency vehicle 200 includes a windshield 202. The windshield 202 is made of a non-conducting material. For example, but without limitation, the windshield 202 may be composed of glass, plastic, a combination of glass and plastic, or any other non-conducting materials. In this embodiment, the windshield 202 is composed of a sheet of plastic between two sheets of glass.

The windshield 202 has an interior surface 204 and an exterior surface 206. A transmitting power module 208 is coupled to the interior surface 204 of the windshield 202. The transmitting power module 208 includes a power induction board 210 and a transmitting induction coil 212.

A user controller 214 includes a wireless communication transmitter 216. The wireless communication transmitter 216 is a device for wirelessly transmitting data to a receiver, such as, but without limitation, a Bluetooth® device, an infrared device, or a wireless local area network device, such as a Wi-Fi device. The wireless communication transmitter 216 transmits a wireless data signal 218 to a receiving power module 220 in response to receiving a user input 222.

The user input 222 is any type of input entered into the user controller 214 by a user. In this example, the user input 222 indicates or identifies one or more control functions associated with an auxiliary vehicle light device that has been chosen or selected by the user. A control function, such as control function 256, controls one or more operations of the LED warning light 248.

In this embodiment, the user controller 214 may include any type of user interface that permits a user to select or enter the desired user input 222 into the user controller 214, such as a graphical user interface, buttons, switches, a touch screen, a keyboard, or any other type of user interface.

When the user controller 214 receives the user input 222, the wireless communication transmitter 216 wirelessly transmits the wireless data signal 218 to the receiving power module 220.

A power source 224 is connected to the transmitting power module 208 and the user controller 214. The power source 224 is a vehicle power source, such as, without limitation, power source 112 in FIG. 1. The power source 224 supplies direct current power 230 to the user controller 214 via the insulated conductor wire 228. The power source 224 supplies direct current power 232 to the transmitting power module 208 via an insulated conductor wire 226.

The insulated conductor wires 226 and 228 may be any type of insulated conductors for transmitting electrical power, such as, but without limitation, insulated conductor wire 130 in FIG. 1. In this example, the insulated conductor wires 226 and 228 are electric wires.

The power induction board 210 associated with the transmitting power module 208 converts the direct current power 232 into an alternating electric current 234 for utilization by the transmitting induction coil 212.

When the transmitting induction coil 212 receives the alternating electric current 234, the transmitting induction coil 212 generates an oscillating magnetic field. In other words, the transmitting induction coil 212 generates an oscillating magnetic field 236 when the alternating electric current 234 runs through the transmitting induction coil 212.

The receiving power module 220 is coupled to the exterior surface 206 of the windshield 202 of the emergency vehicle 200. The receiving power module includes a receiving induction coil 240. The receiving induction coil 240 is a coil or loop of conducting material, such as, but without limitation, copper. The receiving induction coil 240 associated with the receiving power module 220 on the exterior surface 206 of the windshield 202 is positioned so as to be substantially aligned with the transmitting induction coil 212 associated with the transmitting power module 208 coupled to the interior surface 204 of the windshield 202.

When the oscillating magnetic field is within range of the receiving induction coil 240 on the exterior surface 206 of the windshield 202, the oscillating magnetic field 236 interacts with the receiving induction coil 240 to induce an alternating electric current, such as alternating electric current 234.

The receiving power module 220 may optionally include a rectification circuit 238. The rectification circuit 238 is a rectifier that converts the alternating electric current generated by the receiving induction coil 240 into a direct electric current.

The receiving power module 220 may also optionally include a power conditioning board 242. The power conditioning board 242 is a device for improving the quality of the power generated by the receiving induction coil 240 and delivered to the LED warning light 248. The receiving power module 220 then transmits the direct electric current 246 to the LED warning light 248 via an insulated conductor wire 258.

In this embodiment, the receiving power module 220 includes a wireless communication receiver 244. The wireless communication receiver 244 is a device for receiving wireless data from the wireless communication transmitter 216. The wireless communication receiver 244 may be any type of device for receiving a wireless data signal, such as, but without limitation, a Bluetooth® device, an infrared device, or a wireless local area network device, such as a Wi-Fi device. The wireless communication receiver 244 is adapted to receive the wireless data signal 218 from the user controller 214. The wireless communication receiver 244 then transmits the data from the wireless data signal 328 as data signal 245 to the LED warning light 248 via an insulated conductor wire 260.

The LED warning light 248 is mounted to an exterior surface 249 of the emergency vehicle. The exterior surface 249 may be any exterior portion of the vehicle. For example, but without limitation, the exterior surface of the emergency vehicle 200 may be a roof of the emergency vehicle 200, a front grill of the emergency vehicle 200, a side of the emergency vehicle 200, a back bumper of the emergency vehicle 200, an exterior surface of a back windshield, or any other part of the emergency vehicle 200.

A first insulated conductor wire 258 connects the receiving power module 220 to the LED warning light 248. The insulated conductor wire 258 supplies direct electric current 246 to the LED warning light 248. In other words, the insulated conductor wire 258 transmits the direct electric current 246 to power the set of LED lights 250 in the LED warning light 248.

The LED warning light 248 includes a set of LED lights 250, an LED power converter 252, and an LED controller 254. As used herein, the term "set" refers to one or more items. For example, the set of LED lights 250 may include a single LED light, two LED lights, as well as three or more LED lights.

The LED power converter 252 is a device for converting power from one form to another. In this example, the LED power converter 252 changes a voltage or frequency of the direct electric current 246 for utilization by the LED warning light 248. In another example, the LED power converter 252 may optionally convert the direct electric current 246 into alternating current electricity.

The LED controller 254 performs a control function 256 on the set of LED lights 250 in response to receiving the data signal 245. The control function 256 controls one or more functions of the LED warning light 248. The control function may include, for example but without limitation, activating the set of LED lights 250, deactivating the set of LED lights 250, changing a strobe pattern of the set of LED lights 250, changing a luminosity of the set of LED lights 250, changing a frequency of flashing the set of LED lights 250, and/or changing a color pattern of the set of LED lights 250.

In another embodiment, the wireless communication transmitter 216 includes a first pairing switch and the wireless communication receiver 244 includes a second pairing switch. In this example, the second pairing switch syncs the wireless communication receiver 244 associated with the receiving power module 220 to receive the wireless data signal 218 from the wireless communication transmitter 216.

Figures 3, 4:
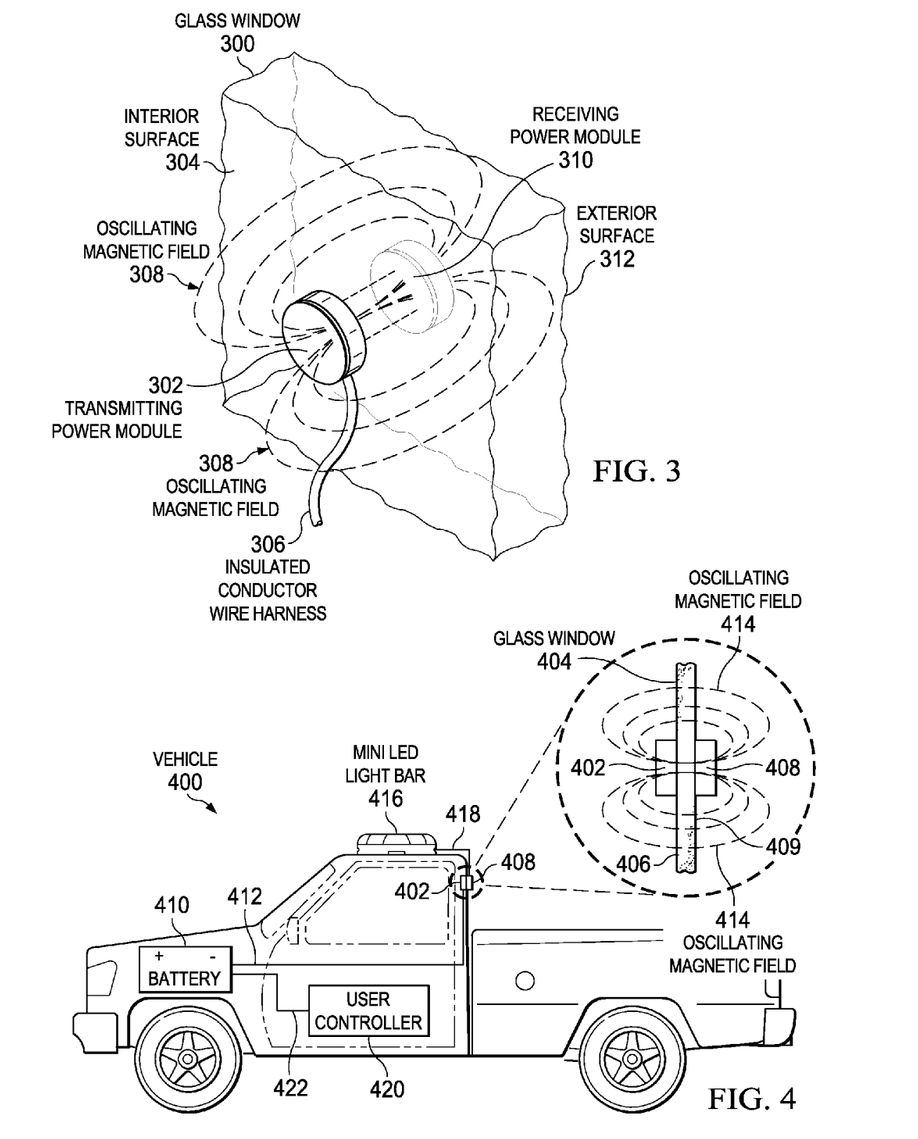
FIG. 3 is an illustration of a vehicle windshield in accordance with an illustrative embodiment.
FIG. 4 is an illustration of a side view of a vehicle having a mini LED light bar in accordance with an illustrative embodiment.

Turning now to FIG. 3, an illustration of a vehicle windshield is shown in accordance with an illustrative embodiment. Glass window 300 is a window or portion of a windshield in a vehicle, such as windshield 106 of vehicle 108 in FIG. 1 and windshield 202 of emergency vehicle 200 in FIG. 2.

Transmitting power module 302 is coupled to an interior surface 304 of the glass window 300. The interior surface 304 is a surface facing an interior of a vehicle when the glass window 300 is installed on a vehicle.

In this example, the glass window 300 is composed entirely of glass. However, in another embodiment, the glass window 300 may be composed of plastic, a combination of glass and plastic, or any other non-conducting material. In this embodiment, the glass window 300 is a portion of a window on a side of a vehicle. However, in another embodiment, the glass window 300 may be a portion of a front windshield, a back windshield, or any other window in a vehicle.

The transmitting power module 302 includes a transmitting induction coil, such as transmitting power module 102 in FIG. 1 and transmitting power module 208 in FIG. 2. An insulated conductor wire harness 306 connects the transmitting power module 302 to a power source (not shown), such as power source 112 in FIG. 1 and power source 224 in FIG. 2. The power source supplies an electric current to the transmitting power module 302. When the transmitting induction coil within the transmitting power module 302 receives an alternating electric current, the transmitting power module 302 generates an oscillating magnetic field 308.

A receiving power module 310 is attached to an exterior surface 312 of the glass window 300. The exterior surface 312 is a surface of the glass window facing an exterior of a vehicle when the glass window 300 is installed on the vehicle.

The receiving power module 310 is a power module that includes a receiving induction coil, such as receiving power module 118 in FIG. 1 and receiving power module 220 in FIG. 2. The transmitting power module 302 is positioned on the interior surface 304 of the glass window 300 so as to be substantially in alignment with the receiving power module 310 attached to the exterior surface 312 of the glass window 300.

The oscillating magnetic field 308 is a magnetic field, such as, but without limitation, the oscillating magnetic field 116 in FIG. 1 and the oscillating magnetic field 236 in FIG. 2. The oscillating magnetic field 308 generated by the transmitting power module 302 on one side of the glass window 300 passes through the glass window 300 to interact with the receiving power module 310 on the exterior surface 312 of the glass window 300. When the oscillating magnetic field 308 comes within range of the receiving power module 310, the receiving power module 310 generates an alternating electric current which is transmitted to an auxiliary light device located on the exterior of the vehicle.

FIG. 4 is an illustration of a side view of a vehicle having a mini LED light bar in accordance with an illustrative embodiment. Vehicle 400 may be any type of vehicle, such as vehicle 108 in FIG. 1 and emergency vehicle 200 in FIG. 2. In this non-limiting example, the vehicle 400 is an emergency vehicle, such as a police truck, construction truck, tow truck, forest ranger vehicle, search and rescue vehicle, or other emergency vehicle.

A transmitting power module 402 is attached to a glass window 404. The transmitting power module 402 is a transmitting power module containing a transmitting induction coil, such as transmitting power module 102 in FIG. 1 and transmitting power module 208 in FIG. 2.

The transmitting power module 402 is attached to an interior surface 406 of the glass window 404. The glass window 404 is a portion of a window or windshield, such as, but without limitation, windshield 106 in FIG. 1, windshield 202 in FIG. 2, and glass window 300 in FIG. 3.

A receiving power module 408 is attached to an exterior surface 409 of the glass window 404. The receiving power module 408 is a device for generating alternating current electricity in response to contacting an oscillating magnetic field 414, such as, but without limitation, the receiving power module 118 in FIG. 1, the receiving power module 220 in FIG. 2, and receiving power module 310 in FIG. 3.

A battery 410 is a power source that supplies an electric current to the transmitting power module 402 through an insulated conductor wire 412 connecting the battery 410 to the transmitting power module 402. When the transmitting power module 402 receives power from the battery 410, the transmitting power module 402 generates the oscillating magnetic field 414. The receiving power module 408 generates an alternating electric current to power the mini LED light bar 416.

The mini LED light bar 416 is an auxiliary light device, such as auxiliary LED light 126 in FIG. 1 and LED warning light 248 in FIG. 2. The mini LED light bar 416 is connected to the receiving power module 408 via an insulated conductor wire 418. Thus, the receiving power module 408 provides electric power to the mini LED light bar 416 through the insulated conductor wire 418.

In this embodiment, a user controller 420 is also connected to the battery 410 via an insulated conductor wire 422. The battery 410 provides power to the user controller 420. In this embodiment, the power provided by the battery 410 is direct electric current electricity.

The user controller 420 is a device for controlling one or more functions of the mini LED light bar 416, such as, without limitation, user controller 214 in FIG. 2. In response to receiving user input from a user, the user controller 214 initiates a control function in the mini LED light bar 416, such as control function 256 in FIG. 2. The control function may turn the mini LED light bar on, turn the mini LED light bar off, change a flashing pattern of the mini LED light bar, change a speed or frequency of a flashing of one or more LED lights within the mini LED light bar, or any other control function associated with the mini LED light bar.

Figure 5:
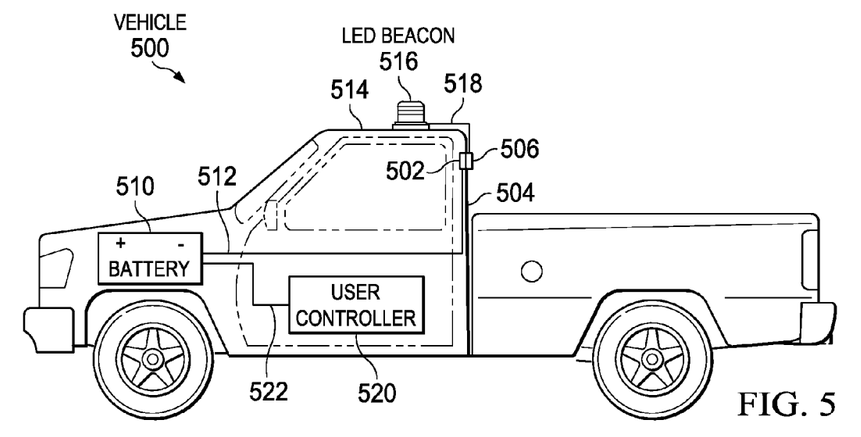
FIG. 5 is an illustration of a side view of a vehicle having a LED beacon light in accordance with an illustrative embodiment.

Referring now to FIG. 5, an illustration of a side view of a vehicle having a LED beacon light in accordance with an illustrative embodiment. Vehicle 500 may be any type of vehicle, such as, but not limited to, vehicle 108 in FIG. 1 and emergency vehicle 200 in FIG. 2. A transmitting power module 502 is coupled to an interior surface of a windshield 504. A receiving power module 506 is coupled to an exterior surface of the windshield 504.

A battery 510 is connected to the transmitting power module 502 via an insulated conductor wire 512. The battery supplies electric current to the transmitting power module 502 through the insulated conductor wire 512. In response to receiving the electric current, the transmitting power module 502 generates an oscillating magnetic field.

A LED beacon 516 is mounted on a roof 514 of the vehicle 500. The roof 514 is an exterior surface of the vehicle 500.

The LED beacon 516 is an auxiliary vehicle light, such as auxiliary LED light 126 in FIG. 1 and LED warning light 248 in FIG. 2. The LED beacon 516 is connected to the receiving power module 506 by an insulated conductor wire 518. The receiving power module 506 generates an alternating electric current in the presence of the oscillating magnetic field. In one embodiment, the alternating electric current powers generated by the receiving power module 506 powers the LED beacon 516.

In another embodiment, the alternating electric current is converted to a direct current of electricity which powers the LED beacon 516. The alternating electric current is converted to a direct current by a rectification circuit and/or a power conditioning board within the receiving power module 506.

In another embodiment, the alternating electric current may be converted to direct current by a power converter within the LED beacon 516. In this embodiment, the power converter may change a voltage or frequency of the electric current received by the LED beacon 516.

A user controller 520 is connected to the battery 510 via another insulated conductor wire 522. The user controller 520 receives an electric current from the battery 510. The user controller 520 is a control device for controlling one or more functions of an auxiliary light device, such as, but without limitation, user controller 204 in FIG. 2 and/or user controller 420 in FIG. 4.

Figure 6:
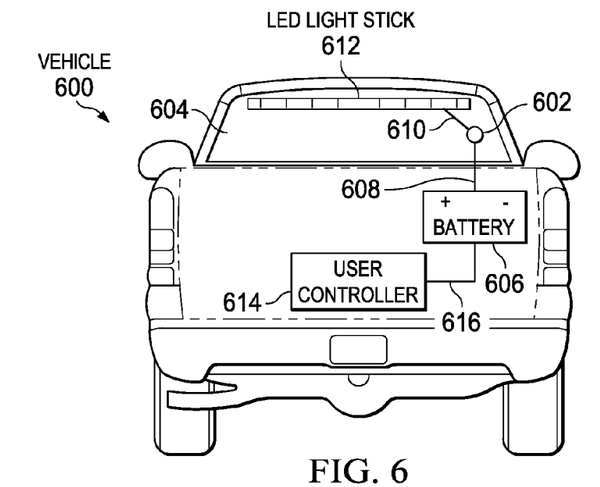
FIG. 6 is an illustration of a back view of a vehicle having a LED light stick in accordance with an illustrative embodiment.

FIG. 6 is an illustration of a back view of a vehicle having a LED light stick in accordance with an illustrative embodiment. Vehicle 600 is a vehicle, such as vehicle 108 in FIG. 1 and emergency vehicle 200 in FIG. 2. A receiving power module 602 is coupled to a back windshield 604. The receiving power module 602 generates an alternating electric current in the presence of an oscillating magnetic field.

In this embodiment, the receiving power module 602 is attached to the windshield 604 on the passenger side of the windshield 604. However, the receiving power module 602 may be attached to the windshield 604 on the driver's side of the windshield 604, approximately in the middle of the windshield 604, or at any other location on the exterior surface of the windshield 604

A battery 606 inside the vehicle 600 is connected to a transmitting power module on an interior of the vehicle 600 by an insulated conductor wire 608. The insulated conductor wire 608 may be any type of insulated conductor for transmitting electricity from the battery 606 to the receiving power module 602.

Another insulated conductor wire 610 connects the receiving power module 606 to a LED light stick 612. The insulated conductor wire 610 supplies an electric current to the LED light stick 612.

The LED light stick 612 is attached or mounted to an exterior surface of the windshield 604. The LED light stick 612 is an auxiliary vehicle light device, such as auxiliary LED light 126 in FIG. 1 and LED warning light 248 in FIG. 2.

A user controller 614 inside the vehicle 600 may also be connected to the battery 606 by another insulated conductor wire 616. The user controller 614 receives electric power from the battery 606 through the insulated conductor wire 616. The user controller 614 in this embodiment is a device for controlling one or more functions of an auxiliary light device, such as, but without limitation, user controller 204 in FIG. 2.

Figure 7:
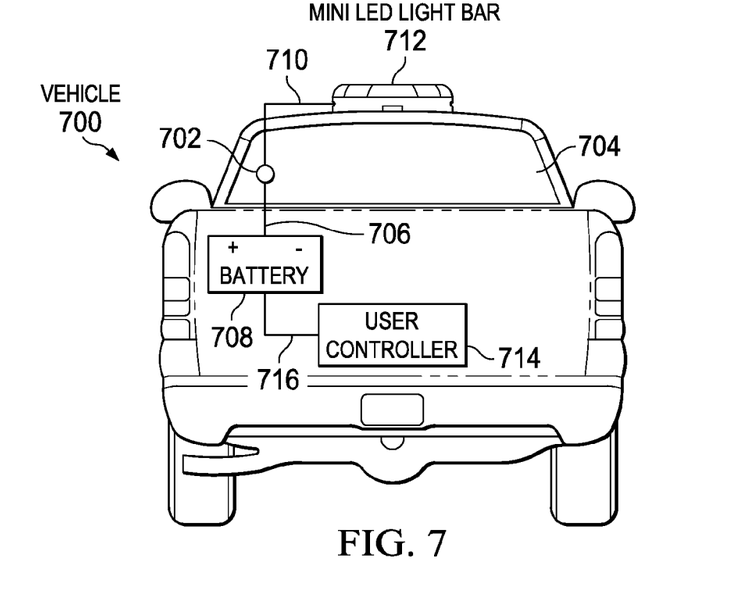
FIG. 7 is an illustration of a back view of a vehicle having a LED mini LED light bar in accordance with an illustrative embodiment.

Turning now to FIG. 7, an illustration of a back view of a vehicle having a mini LED light bar is shown in accordance with an illustrative embodiment. Vehicle 700 is a vehicle, such as vehicle 108 in FIG. 1 and emergency vehicle 200 in FIG. 2.

A receiving power module 702 is coupled to an exterior surface of a back windshield 704 of the vehicle 700. The receiving power module 702 generates an alternating electric current in the presence of an oscillating magnetic field.

In this embodiment, the receiving power module 702 is attached to the exterior surface of the back windshield 704 on the driver's side of the vehicle 700. However, the receiving power module 702 may be attached to the back windshield 704 at any location on the windshield 704. For example, the receiving power module 702 may be attached to the windshield on the passenger side or at a location on or about the middle of the windshield 704.

An insulated conductor wire 706 connects a battery 708 within the vehicle 700 to a transmitting power module (not shown) on an interior of the vehicle 700. The insulated conductor wire 706 may be any type of insulated conductor for transmitting electricity from the battery 708 to the transmitting power module.

Another insulated conductor wire 710 connects the receiving power module 706 to a mini LED light bar 710. The insulated conductor wire 710 supplies the alternating electric current to the mini LED light bar 712. The mini LED light bar 712 is an auxiliary vehicle light device, such as auxiliary LED light 126 in FIG. 1 and LED warning light 248 in FIG. 2.

A user controller 714 is also connected to the battery 708 by another insulated conductor wire 716. The user controller 714 is a control device, such as, but without limitation, user controller 204 in FIG. 2. The user controller 714 receives electric power from the battery 708 through the insulated conductor wire 716.

Figure 8:
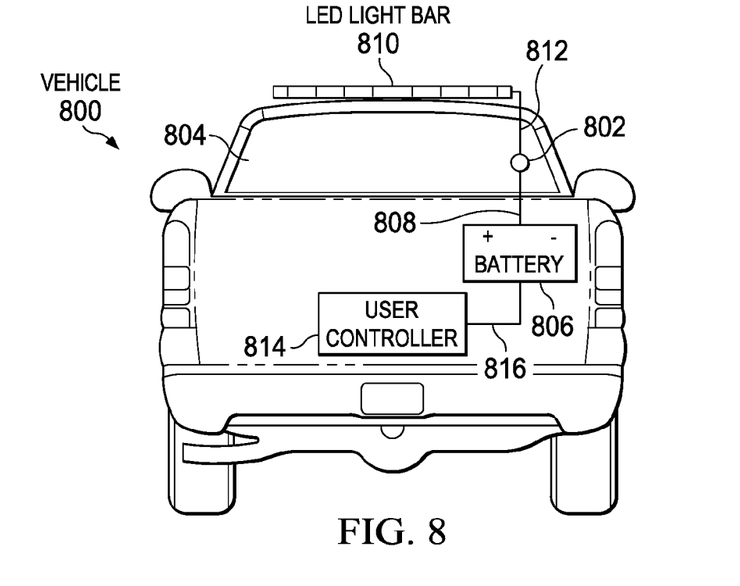
FIG. 8 is an illustration of a back view of a vehicle having a LED light bar in accordance with an illustrative embodiment.

Referring now to FIG. 8, an illustration of a back view of a vehicle having a LED light bar is depicted in accordance with an illustrative embodiment. Vehicle 800 is a vehicle, such as vehicle 108 in FIG. 1 and emergency vehicle 200 in FIG. 2. A receiving power module 802 is coupled to a back windshield 804. The receiving power module 802 generates an alternating electric current in the presence of an oscillating magnetic field.

The receiving power module 802 may be coupled to the back windshield 804 at an upper driver's side corner, at an upper passenger side corner of the windshield 804, at a lower corner at the driver's side of the back windshield 804, at a lower corner of the passenger's side of the back windshield 804, on or about the middle of the windshield 804, or any other location on the exterior of the windshield 804. A battery 806 within the vehicle 800 is connected to a transmitting power module (not shown) on an interior of the vehicle 800 by an insulated conductor wire 808. The insulated conductor wire 808 may be any type of insulated conductor for transmitting electricity from the battery 806 to the transmitting power module.

The transmitting power module 802 generates an alternating electric current in response to a presence of the oscillating magnetic field. The transmitting power module 802 supplies the alternating electric current to the LED light bar 810 via an insulated conductor wire 812. The LED light bar 810 is an auxiliary vehicle light device, such as auxiliary LED light 126 in FIG. 1 and LED warning light 248 in FIG. 2.

A user controller 814 is also connected to the battery 808 by another insulated conductor wire 816. The user controller 814 receives electric power from the battery 806 through the insulated conductor wire 816. The user controller 814 initiates a control function in the LED light bar 810 in response to receiving a user input.

Figure 9:
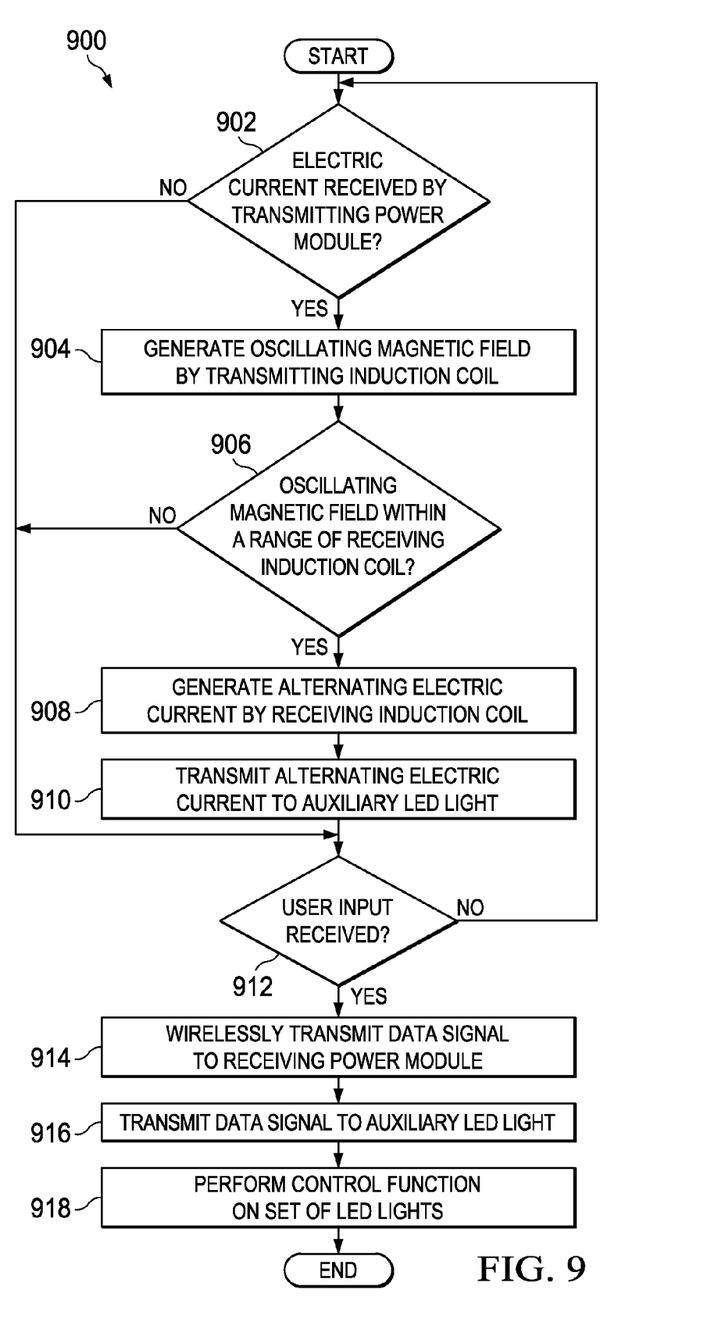
FIG. 9 is a flowchart illustrating a process for induction power transfer to a vehicle auxiliary LED light device in accordance with an illustrative embodiment.

FIG. 9 is a flowchart illustrating a process for induction power transfer to a vehicle auxiliary LED light device in accordance with an illustrative embodiment. The process in FIG. 9 is implemented by a vehicle induction power transfer system, such as vehicle induction power transfer system 100 in FIG. 1.

The process begins by making a determination as to whether an electric current is received by a transmitting power module (step 902). If an electric current is received at step 902, a transmitting induction coil associated with the transmitting power module generates an oscillating magnetic field (step 904).

A determination is made as to whether an oscillating magnetic field is within a range of a receiving induction coil (step 906). If an oscillating magnetic field is within a range of the receiving induction coil at step 906, the receiving induction coil generates an alternating electric current (step 908). The alternating electric current is transmitted to an auxiliary LED light (step 910).

A determination is made as to whether a user input is received (step 912). If a user input is not received at step 912, the process returns to step 902.

Returning now to step 912, if a user input is received, a data signal is wirelessly transmitted to the receiving power module (step 914). The data signal is transmitted to an auxiliary LED light (step 916). A control function is performed on the set of LED lights (step 918) with the process terminating thereafter.

Returning now to step 902, if an electric current is not received by the transmitting power module, the process skips to step 912 to determine whether a user input is received. The process then iteratively executes steps 912 through 918 as described above.

Returning now to step 906, if an oscillating magnetic field is not within a range of the receiving induction coil, the process returns to step 912 to determine whether a user input is received. The process then iteratively executes steps 912 through 918 as described above.

In some alternative implementations, the functions noted in the steps of the flowchart shown in FIG. 9 may occur out of the order noted in FIG. 9. For example, two steps shown in succession may, in fact, be executed substantially concurrently, or the steps may sometimes be executed in the reverse order, depending upon the functionality involved.

The illustrative embodiments provide a method, system, and apparatus for wirelessly providing power to an auxiliary vehicle light device using inductive power transfer. The embodiments overcome the problem caused by the metal vehicle body interfering with the magnetic induction process.

Powering auxiliary vehicle lights using the vehicle induction power transfer system of the embodiments enables a user to install auxiliary vehicle lights on a vehicle without drilling any holes in a roof or body of the vehicle to accommodate electrical wiring into the vehicle and to the battery. Instead, the embodiments wire the auxiliary vehicle light to a receiving power module that attaches to a windshield or other conducting surface on the vehicle to receive the wirelessly transmitted power. In this manner, the embodiments minimize or avoid creation of undesirable holes and other permanent modifications to the vehicle body and roof.

Likewise, the induction power transfer system of the embodiments minimizes or avoids the need to disassemble multiple parts of the vehicle interior and exterior to accommodate electrical wiring from the auxiliary light device to the battery. Thus, the embodiments make auxiliary light device installation less time consuming, simpler, and more efficient.

The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. Any feature that is described in connection to any one embodiment may also be applicable to any other embodiment. It is also understood that other embodiments may be utilized and that logical structural, mechanical, and chemical changes may be made without departing from the spirit or scope of the invention.

What is claimed is:

1. A vehicle induction power transfer system for auxiliary vehicle lights, the vehicle induction power transfer system comprising:
    a transmitting power module coupled to an interior surface of a windshield of a vehicle;
    a transmitting induction coil associated with the transmitting power module;
    a power source connected to the transmitting power module, wherein the power source supplies a first electric current to the transmitting power module;
    an oscillating magnetic field generated by the transmitting induction coil in response to the first electric current passing through the transmitting induction coil;
    a receiving power module coupled to an exterior surface of the windshield of the vehicle and substantially aligned with the transmitting power module coupled to the interior surface of the windshield;
    a receiving induction coil associated with the receiving power module, wherein the receiving induction coil generates a second electric current in response to a presence of the oscillating magnetic field;
    an auxiliary LED light coupled to an exterior surface of the vehicle; and
    an insulated conductor connecting the auxiliary LED light to the receiving power module, wherein the receiving power module supplies the second electric current to the auxiliary LED light, wherein the second electric current supplied by the receiving power module powers the auxiliary LED light coupled to the exterior surface of the vehicle.

2. The vehicle induction power transfer system of claim 1 further comprising:
    a user controller coupled to a controller power source within an interior of the vehicle, the user controller further comprising:
        a wireless communication transmitter configured to wirelessly transmit a data signal to the receiving power module coupled to the exterior surface of the windshield of the vehicle;
    a wireless communication receiver associated with the receiving power module and adapted to receive the data signal from the wireless communication transmitter, wherein the receiving power module transmits the data signal to the auxiliary LED light via the insulated conductor connecting the receiving power module to the auxiliary LED light; and
    an LED controller associated with the auxiliary LED light, wherein the LED controller performs a control function with respect to a set of lights within the auxiliary LED light in response to receiving the data signal from the user controller.

3. The vehicle induction power transfer system of claim 2 further comprising:
    a first pairing switch associated with the wireless communication transmitter; and
    a second pairing switch associated with the wireless communication receiver, wherein the second pairing switch syncs the receiving power module to receive the data signal from the wireless communication transmitter.

4. The vehicle induction power transfer system of claim 2 wherein the auxiliary LED light is a LED warning light associated with an emergency vehicle, and wherein the emergency vehicle light further comprises:
    a set of LED lights.

5. The vehicle induction power transfer system of claim 4, wherein the control function comprises at least one of activating the set of LED lights within the LED warning light, deactivating the set of LED lights within the LED warning light, changing a strobe pattern of the set of LED lights within the emergency vehicle light, changing a frequency of flashing the set of LED lights within the LED warning light, changing a luminosity of the set of LED lights within the LED warning light, and changing a color pattern of the set of LED lights within the LED warning light.

6. The vehicle induction power transfer system of claim 1 wherein the auxiliary LED light is LED warning light, wherein the LED warning light is a LED light bar, a LED mini LED light bar, a LED light stick, a LED light strip, a LED license plate warning light, or a LED beacon light.

7. The vehicle induction power transfer system of claim 1 wherein the auxiliary LED light is an LED roof mounted sign, an electronic advertisement box, an electronic bus route sign, off-road fog lamps, or truck bed lighting.

8. The vehicle induction power transfer system of claim 1 wherein the auxiliary LED light is mounted to a roof of the vehicle.

9. An inductive power transfer system for an emergency vehicle, the inductive power transfer system comprising:
    a windshield of an emergency vehicle having an interior surface and an exterior surface;
    a transmitting power module coupled to the interior surface of the windshield, the transmitting power module comprising a power induction board and a transmitting induction coil;
    a user controller, the user controller comprising a wireless communication transmitter, wherein the wireless communication transmitter is adapted to transmit a wireless data signal to a receiving power module responsive to the user controller receiving a user input;

a first insulated conductor connecting a power source to the transmitting power module;

a second insulated conductor connecting the power source to the user controller, wherein the power source supplies direct current power to the transmitting power module and the user controller, wherein the power induction board converts the direct current power to a first alternating electric current;

an oscillating magnetic field, wherein the oscillating magnetic field is generated by the transmitting induction coil responsive to receiving the first alternating electric current from the power source;

the receiving power module coupled to the exterior surface of the windshield of the emergency vehicle substantially aligned with the transmitting power module on the interior surface of the windshield, the receiving power module comprising:
- a receiving induction coil;
- a rectification circuit associated with the receiving induction coil;
- a power conditioning board; and
- a wireless communication receiver adapted to receive the wireless data signal from the transmitting power module and transmit a data signal to a LED warning light;

the LED warning light mounted to an exterior surface of the emergency vehicle, the LED warning light comprising:
- a set of LED lights; and
- an LED power converter;

a third insulated conductor connecting the LED warning light to the receiving power module, wherein the third insulated conductor supplies a direct electric current to the LED warning light, and wherein the direct electric current powers the LED warning light;

a fourth insulated conductor connecting the wireless communication receiver to an LED controller associated with the LED warning light, wherein the fourth insulated conductor transmits the data signal from the wireless communication receiver to the LED warning light; and the LED controller adapted to perform a control function on the set of LED lights in response to receiving the data signal.

10. The emergency vehicle of claim 9 wherein the control function comprises at least one of activating the set of LED lights within the light bar, deactivating the set of LED lights within the light bar, changing a strobe pattern of the set of LED lights within the light bar, changing a frequency of flashing of the set of LED lights within the light bar, changing a luminosity of the set of LED lights within the light bar, and changing a color pattern of the set of LED lights within the light bar.

11. The emergency vehicle of claim 9 wherein the light bar is an emergency vehicle light bar, and wherein the vehicle is a law enforcement vehicle, fire truck, search and rescue vehicle, emergency medical services vehicle, tow truck, construction vehicle, or public utility vehicle.

12. The emergency vehicle of claim 9 further comprising:
a first pairing switch within the wireless communication transmitter associated with the user controller; and
a second pairing switch within the wireless communication receiver associated with the receiving power module, wherein the second pairing switch syncs the receiving power module to receive the wireless data signal from the wireless communication transmitter.

13. The emergency vehicle of claim 9 wherein the LED warning light is an LED light bar, an LED mini light bar, an LED light stick, an LED light strip, a LED license plate warning light, or a LED beacon light.

14. The vehicle wireless power transfer system of claim 9 wherein the windshield is a back windshield of the vehicle.

15. A method for induction power transfer to an auxiliary vehicle LED light mounted on an exterior surface of a vehicle, the method comprising:
responsive to receiving an electric current by a transmitting power module, generating an oscillating magnetic field by a transmitting induction coil associated with the transmitting power module, wherein the transmitting power module is coupled to an interior surface of a windshield of the vehicle;
responsive to a presence of the oscillating magnetic field within a range of a receiving induction coil associated with a receiving power module, generating an alternating electric current by the receiving induction coil, wherein the transmitting power module coupled to the interior surface of the windshield is substantially aligned with the receiving power module coupled to an exterior surface of the windshield of the vehicle;
transmitting the second alternating electric current to the auxiliary vehicle LED light mounted on the exterior surface of the vehicle via a set of insulated conductors, wherein the second alternating electric current powers the auxiliary vehicle LED light, and wherein the auxiliary vehicle LED light comprises a set of LED lights;
responsive to receiving a user input by a user controller, transmitting a data signal to the receiving power module mounted on the exterior surface of the vehicle;
transmitting the data signal from the receiving power module to the auxiliary vehicle LED light via the set of insulated conductors; and
performing a control function on the set of LED lights in response to receiving the data signal.

16. The method of claim 15 wherein performing a control function on the set of LED lights further comprises activating the set of LED lights or deactivating the set of LED lights.

17. The method of claim 15 wherein performing a control function on the set of LED lights further comprises changing a strobe pattern of the set of LED lights, changing a luminosity of the set of LED lights, dimming the set of LED lights, changing a frequency of flashing of the set of LED lights, or changing a color pattern of the set of LED lights.

18. The method of claim 15 further comprising:
syncing a first pairing switch associated with the wireless communication transmitter within the user controller with a second pairing switch associated with the wireless communication receiver within the receiving power module.

19. The method of claim 15 wherein the auxiliary vehicle LED light is a LED warning light, wherein the LED warning light is a LED light bar, a mini LED light bar, a LED light stick, a LED light strip, a LED license plate warning light, or a LED beacon light.

20. The method of claim 15 further comprising:
coupling the transmitting power module to an interior surface of a back windshield of the vehicle; and
coupling the receiving power module to an exterior surface of the back windshield of the vehicle, wherein the receiving power module is substantially aligned with the transmitting power module.

* * * * *